F. C. WRIGHT.
PIPE CLEANER.
APPLICATION FILED SEPT. 12, 1916.

1,240,641.

Patented Sept. 18, 1917.

Witness
P. M. Hunt

Inventor
Frederick C. Wright.
By John Louis Waters
Attorney

UNITED STATES PATENT OFFICE.

FREDERICK C. WRIGHT, OF HALIFAX, NOVA SCOTIA, CANADA.

PIPE-CLEANER.

1,240,641.     Specification of Letters Patent.     Patented Sept. 18, 1917.

Application filed September 12, 1916. Serial No. 119,790.

*To all whom it may concern:*

Be it known that I, FREDERICK C. WRIGHT, a subject of the King of Great Britain, residing at Halifax, in the Province of Nova Scotia and Dominion of Canada, have invented certain useful Improvements in Pipe-Cleaners, of which the following is a specification, reference being had therein to the accompanying drawing.

This invention relates to improvements in cleaners or scrapers for smokers' pipes, one object of the invention being the provision of a device which is readily adjustable to various sized bowls, so that tobacco and sediment that adheres to the bowl may be scraped and cleaned therefrom in an easy and thorough manner.

A further object of this invention is the provision of a device of this character which is simple, durable, and inexpensive in construction, and thoroughly efficient and practical in use.

In the accompanying drawings:—

Figure 1:
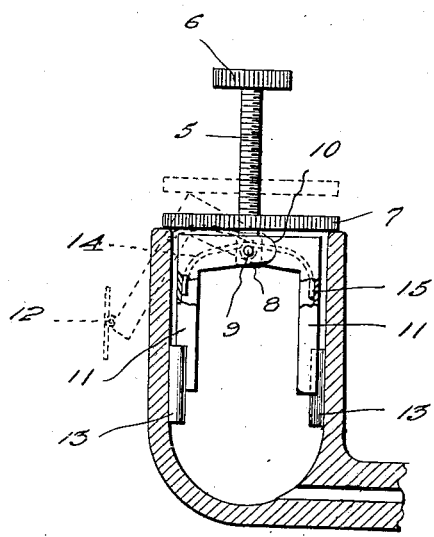
Figure 1 is a view in elevation of the device, showing a pipe bowl in section.
Figure 2:
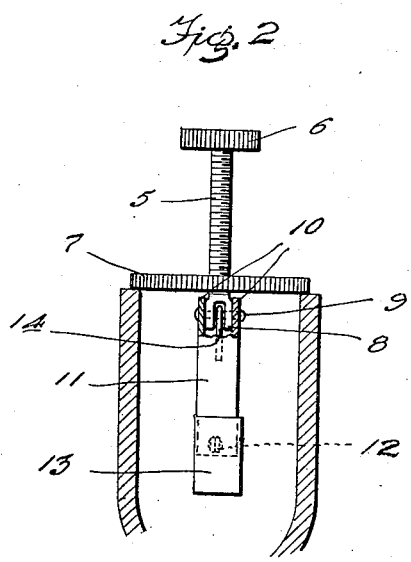
Fig. 2 is a view taken at right angles to that shown in Fig. 1.

Referring to the drawings, the numeral 5 designates a threaded shank or stem which carries the milled operating disk 6 and has mounted thereon the large milled disk 7 which threadedly engages the stem 5 and is capable of movement to assume the dotted line position in Fig. 1.

The lower end 8 of the stem 5 is reduced and apertured to receive the pin 9 to which is pivoted the terminals 10 of the two L-shaped members.

Swingingly connected as at 12 to the free terminals of the members 11 are the scrapers or blades 13 which can thus be maintained in proper relation to the inner wall of the bowl during the cutting operation.

Mounted upon the pin 9 is a spring 14 whose opposite terminals 15 are anchored or attached to the respective members 11 so as to normally extend the scrapers.

Thus, when the milled member 7 is rotated or twirled upon the shank 5 toward the knob 6, the spring will act to cause the L-shaped members 11 to assume the dotted line position in Fig. 1, so that the complete device may be rotated by the operating disk 6 to cause the scrapers to cut and remove the sediment from the wall of the bowl.

By this construction, various sized bowls may be operated upon and cleaned readily without injuring the pipe.

What I claim as new is:—

1. A cleaner or scraper for smokers' pipes, including a threaded shank, an operating member carried at one end thereof, two hingedly connected members attached to the opposite end of said shank, a scraper carried by each of said members, a spring for normally extending the members, and an adjusting member for limiting the extension of such members mounted upon the threaded shank.

2. A cleaner or scraper for smokers' pipes, including a threaded shank, an operating knob upon one end thereof, two L-shaped members pivotally connected to one end of the shank for swinging movement, a spring connected to both of said members for extending the free ends thereof, a scraper blade swingingly connected to the free end of each of said L-shaped members, and a disk threadedly engaging the shank for limiting the extensibility of the L-shaped members.

In testimony whereof I affix my signature.

FREDERICK C. WRIGHT.

Copies of this patent may be obtained for five cents each, by addressing the "Commissioner of Patents, Washington, D. C."